United States Patent [19]

Idemura et al.

[11] Patent Number: 6,063,862
[45] Date of Patent: May 16, 2000

[54] GLASS-POLYAMIDE COMPOSITE AND PROCESS FOR PRODUCING THE SAME

[75] Inventors: Satoshi Idemura; Kazutoshi Haraguchi, both of Chiba, Japan

[73] Assignee: Dainippon Ink and Chemicals, Inc., Tokyo, Japan

[21] Appl. No.: 09/265,401

[22] Filed: Mar. 10, 1999

[30]     Foreign Application Priority Data

Mar. 11, 1998    [JP]    Japan .................................. 10-059541
Aug. 12, 1998    [JP]    Japan .................................. 10-227727

[51] Int. Cl.[7] .............................. C08J 3/00; C08K 3/20; C08L 77/00; C08L 79/00; D21F 11/00
[52] U.S. Cl. ...................... 524/606; 162/157.3; 264/143; 264/148; 524/492; 524/493; 524/494; 524/608; 528/336
[58] Field of Search .................................... 524/492, 493, 524/494, 606, 608; 528/336; 264/143, 148; 162/157.3

[56]         References Cited

U.S. PATENT DOCUMENTS

| | | | |
|---|---|---|---|
| 2,708,617 | 5/1955 | Magat et al. | 18/54 |
| 2,831,834 | 4/1958 | Magat | 260/78 |
| 3,006,899 | 10/1961 | Hill, Jr. et al. | 260/78 |
| 3,063,966 | 11/1962 | Kwolek et al. | 260/78 |
| 3,708,456 | 1/1973 | Karddos | 260/37 N |
| 5,880,201 | 3/1999 | Enomoto et al. | 524/492 |

*Primary Examiner*—Patrick D. Niland
*Attorney, Agent, or Firm*—Armstrong, Westerman, Hattori, McLeland & Naughton

[57]             ABSTRACT

Disclosed is a process for producing a glass-polyamide composite comprising bringing into contact or mixing (A) an aqueous solution containing water, water glass, and a diamine and (B) an organic solution containing an organic solvent and a dicarboxylic acid halide to carry out polyamide formation and polycondensation of water glass simultaneously.

13 Claims, No Drawings

GLASS-POLYAMIDE COMPOSITE AND PROCESS FOR PRODUCING THE SAME

FIELD OF THE INVENTION

This invention relates to a glass-polyamide composite, a process for producing the same, fibrid of the composite, and paper made of the fibrid. More particularly, it relates to a glass-polyamide composite, fibrid, and paper excel lent in heat resistance, mechanical characteristics, hardness, and thermal expansion characteristics, and an economical process for producing the same.

BACKGROUND OF THE INVENTION

Polyamides are known as engineering plastics and has enjoyed wide applications. It has been known that the mechanical characteristics of polyamides are improved by mixing a filler such as glass. A method which has been used widely for preparing such a glass-polyamide composite comprises kneading a fusible polyamide such as an aliphatic polyamide including nylon 66 and glass fiber, typically chopped strands, in an extruder, etc. According to this method, a composite is prepared by heating separately prepared polyamide to high temperature above the melting point. However, glass fiber is not dispersed uniformly in the polyamide matrix so that the degree of improvement, e.g., an increase in hardness or a reduction in linear thermal expansion coefficient is not sufficient. Besides, the method is inapplicable to non-fusible aromatic polyamide.

Water glass is one of the most inexpensive inorganic materials. Water glass can be seen as glass having the simplest composition. Abundant in nature and well supplied, it is useful as a raw material for detergents, soil stabilizers, fire proofing agents, refractory cement, silica gel, and the like.

However, if water glass, which has a high alkali metal content, is mixed into polyamide as a filler in accordance with the conventional method, it fails to afford sufficient mechanical characteristics or electrically insulating properties on account of its strong character as an alkali metal salt. In addition, an alkali metal present in a glass composition tends to be converted to a hydroxide or a carbonate, which will destroy the chemical structure of glass.

U.S. Pat. Nos. 3,006,899, 3,063,966, 2,708,617, and 2,831,834 describe synthesis of polyamides by interfacial polymerization with no reference to preparation of a composite with glass. U.S. Pat. No. 3,708,456 discloses preparation of a composite comprising interfacial polymerization in the presence of inorganic fiber such as silica. According to U.S. Pat. No. 3,708,456, previously prepared inorganic fibers having a relatively large size are incorporated into polyamide, failing to be finely dispersed in the polyamide matrix. The resulting composite shows insufficient improvement in thermal and mechanical characteristics and suffers from considerable anisotropy in manifestation of the characteristics due to the shape of the fibers.

SUMMARY OF THE INVENTION

The present invention provides a process for producing a glass-polyamide composite comprising bringing into contact or mixing (A) an aqueous solution containing water, water glass, and a diamine and (B) an organic solution containing an organic solvent and a dicarboxylic acid halide to carry out: polyamide formation and polycondensation of water glass simultaneously.

The present invention further provides a process for producing paper or sheet using the resulting fibrid.

The present invention additionally provides fibrid, paper or a sheet obtained by the above processes.

According to the invention, polyamide formation and preparation of a polyamide composite with glass can be carried out simultaneously at room temperature. Inexpensive water glass is used as a raw material. Since glass is dispersed in the matrix polyamide finely and uniformly, there are provided a glass-polyamide composite, fibrid, and paper which are excellent in heat resistance, mechanical characteristics, hardness, and thermal expansion characteristics.

The object of the present invention is accomplished by the following aspects (1) to (13):

(1) A process for producing a glass-polyamide composite comprising bringing into contact or mixing (A) an aqueous solution containing water, water glass, and a diamine and (B) an organic solution containing an organic solvent and a dicarboxylic acid halide to carry out polyamide formation and polycondensation of water glass simultaneously;

(2) The process described in (1), wherein the glass of said composite has an average particle size of 8 to 160 nm;

(3) The process described in (1) or (2), wherein said water glass is represented by formula $M_2O \cdot nSiO_2$ wherein M is an alkali metal, and n is 1.2 to 4;

(4) The process described in (1) or (2), wherein said aqueous solution (A) has a water glass concentration of 4 to 240 g/l and a diamine concentration of 0.01 to 5 mol/l, and said organic solution (B) has a dicarboxylic acid halide concentration of 0.01 to 5 mol/l;

(5) The process described in (1) or (2), wherein said diamine is at least one member selected from the group consisting of 1,4-diaminobutane, 1,6-diaminohexane, p-phenylenediamine, m-phenylenediamine, and m-xylylenediamine, and said dicarboxylic acid halide is at least one member selected from the group consisting of adipoyl chloride, sebacoyl chloride, terephthaloyl chloride, and isophthaloyl chloride;

(6) The process described in (1) or (2), wherein the glass in the composite has an alkali metal content of less than 2.2% by weight;

(7) A glass-polyamide composite having uniformly dispersed therein 5 to 68% by weight of glass having an average particle size of 8 to 160 nm, the composite being obtained by the process described in any one of (1) to (6);

(8) The glass-polyamide composite described in (7), which has a linear thermal expansion coefficient of $3 \times 10^{-6}$ (1/° C.) or less at −30° C. to 30° C.;

(9) A process for producing fibrid comprising mechanically cutting the glass-polyamide composite described in (7) or (8);

(10) A process for producing fibrid comprising mixing the glass-polyamide composite described in (7) or (8) with the same or different polyamide from that of said glass-polyamide composite in an organic solvent, placing the mixture in a coagulating bath, and mechanically cutting the resulting solid;

(11) Fibrid of a glass-polyamide composite which has uniformly dispersed therein glass having an average particle size of 8 to 160 nm, obtained by the process described in (9) or (10);

(12) A process for producing paper or sheet comprising using the fibrid obtained by the process described in (9) or (10); and

(13) Paper or sheet made of fibrid of a glass-polyamide composite having uniformly dispersed therein glass having an average particle size of 8 to 160 nm, obtained by the process described in (12).

DETAILED DESCRIPTION OF THE INVENTION

The polyamide which can be used in the present invention is synthesized by bringing into contact (A) an aqueous solution containing a diamine and (B) an organic solution containing a dicarboxylic acid halide to cause the bifunctional monomers to polycondensate. The reaction is based on application of Schotten-Baumann reaction to organic polymer synthesis, in which bifunctional monomers in the respective solutions are polymerized. On contact or mixing of the aqueous solution (A) and the organic solution (B), the diamine in (A) and the dicarboxylic acid halide in (B) react at room temperature to give a corresponding polyamide almost instantaneously. Although the reaction is a polycondensation reaction, it is substantially a non-equilibrium reaction. That is, the molar ratio of the monomers is not so influential on the degree of polymerization of the resulting organic polymers. Therefore it is not necessary to adjust the molar ratio strictly.

The diamines which can be used in the present invention include aliphatic diamines, such as 1,2-diaminoethane, 1,3-diaminopropane, 1,4-diaminobutane, 1,5-diaminopentane, 1,6-diaminohexane, and 1,9-diaminononane; aromatic diamines, such as m-xylylenediamine, p-xylylenediamine, m-phenylenediamine, p-phenylenediamine, 1,5-diaminonaphthalene, 1,8-diaminonaphthalene, 2,3-diaminonaphthalene, 3,4'-diaminodiphenyl ether, 4,4'-diaminodiphenyl ether, 3,4'-diaminodiphenyl sulfone, 4,4'-diaminodiphenyl sulfone, 3,4'-diaminodiphenylmethane, and 4,4'-diaminodiphenylmethane; and substituted aromatic diamines derived from the above-enumerated aromatic diamines by substituting one or more hydrogen atoms on the aromatic nucleus or nuclei with a halogen atom, a nitro group or an alkyl group. Of these diamines preferred are 1,4-diaminobutane, 1,6-diaminohexane, p-phenylenediamine, m-phenylenediamine, and m-xylylenediamine. The diamines can be used either individually or as a combination of two or more thereof.

The dicarboxylic acid halides which can be used in the invention include aliphatic dicarboxylic acid halides, such as adipoyl chloride, azelaoyl chloride, and sebacoyl chloride; aromatic dicarboxylic acid halides, such as isophthaloyl chloride and terephthaloyl chloride; and substituted aromatic ones derived from these aromatic dicarboxylic acid halides by substituting one or more hydrogen atoms on the aromatic rings with a halogen atom, a nitro group or an alkyl group. Preferred of these dicarboxylic acid halides are adipoyl chloride, sebacoyl chloride, terephthaloyl chloride and isophthaloyl chloride. The dicarboxylic acid halides can be used either individually or as a combination of two or more thereof.

Preferred combinations of the monomers are 1,6-diaminohexane/adipoyl chloride, 1,6-diaminohexane/isophthaloyl chloride and/or terephthaloyl chloride, m-phenylenediamine/isoterephthaloyl chloride, and m-xylylenediamine/isophthaloyl chloride. For obtaining a fibrous material capable of entanglement and useful as a paper-making material, which we call fibrid, directly from the reaction system, a combination of an aliphatic diamine and an aliphatic dicarboxylic acid halide is preferred. A combination of 1, 6-diaminohexane and adipoyl chloride which provides nylon 66 is particularly preferred.

The aqueous solution (A) essentially contains the diamine, water glass and water. Water glass is composed of an alkali metal (M), silicon, and oxygen, being generally represented by formula $M_2O.nSiO_2$. Water glass is distinguished from common glass because of its high water solubility. Preferred water glass is the one in which M is an alkali metal, e.g., Na or K. From the standpoint of water solubility, n is preferably 1.2 to 4.

It is one of the advantages of the present invention that water glass can be directly used without pretreatment such as hydrolysis or silylation. The concentration of water glass in the aqueous solution (A) is preferably 4 to 240 g/l. In concentrations lower than 4 g/l, the amount of glass distributed in the polyamide tends to be insufficient for producing desired effects. In concentrations exceeding 240 g/l, the solution tends to be too viscous, or glass tends to fail to be dispersed uniformly. The glass content in the composite can be controlled by adjusting the glass concentration.

The concentration of the diamine in the solution (A) is not particularly limited as is consistent with sufficient progress of polycondensation. A preferred diamine concentration ranged from 0.01 to 5 mol/l, particularly 0.1 to 1.5 mol/l. In order to accelerate the polycondensation reaction, an acid acceptor, e.g., sodium hydroxide, and/or a surface active agent, e.g., sodium lauryl sulfate, can be added to the aqueous solution (A).

An acid acceptor serves to neutralize the proton released upon reaction, and a surface active agent functions to increase the contact efficiency between monomers therein to accelerate the reaction. In many cases the reaction proceeds sufficiently in the absence of an acid acceptor or a surface active agent because water glass itself is basic, acting as an acid acceptor. It is desirable that the aqueous solution (A) is uniform and transparent.

The organic solution (B) essentially contains the dicarboxylic acid halide and an organic solvent. Examples of useful organic solvents are toluene, xylene, chloroform, cyclohexane, cyclohexanone, and tetrahydrofuran. Toluene, xylene, chloroform and cyclohexane are insoluble in water, cyclohexanone is slightly soluble in water, and tetrahydrofuran is well miscible with water. Irrespective of the water solubility of the organic solvent, the polyamide forming reaction proceeds on the interface between the aqueous solution (A) and the organic solution (B) or in the mixture of the solutions (A) and (B).

The dicarboxylic acid halide is preferably used in an equimolar amount to the diamine in the aqueous solution (A) and in a concentration of 0.1 to 5 mol/l, particularly 0.1 to 1.5 mol/l. It is preferred for the organic solution (B) to be uniform and transparent.

The solutions (A) and (B) are prepared easily by mixing the solute(s) into water or the respective solvents at room temperature by stirring. Each solute may previously be dissolved in water or the respective solvent before mixing to prepare the solution.

The reaction is effected by either bringing the solutions (A) and (B) into contact with each other or mixing the solutions (A) and (B). Both types of the reaction can be performed in an unstirred or stirred system. In either mode of reaction, the reaction rate is high, therefore operative in a temperature range of from −5° C. to 40° C. That is, the reaction can be performed at room temperature without requiring heating equipment.

In a unstirred system, it is possible to conduct continuous withdrawing and spinning of the composite produced on the interface between the solutions (A) and (B). The resulting composite in the form of thread can be cut mechanically into fibrid from which paper is made. The fibrid obtained in an unstirred system is usually longer and provides stronger paper than that obtained in a stirred system hereinafter described. Tough as it is, the thus spun composite needs great force for cutting. For example, a high-speed stirrer with metal blades is desirably used for cutting.

In a stirred system, one of the aqueous solution (A) and the organic solution (B) is added to the other while being stirred either all at once or dropwise. A stirrer having a cutting function can be used for stirring the system, whereby the composite formed is cut immediately to produce fibrid speedily. Compared with the unstirred system, the stirred system achieves the reaction in a shorter time. For example, the reaction time may be set at about 2 minutes. The polymer formation and the cutting of the composite can be conducted simulataneously. Attention should be paid for the stirring conditions because highly intensive cutting of the product brings about fibrid with short length which is impractical for paper fabrication.

In order to secure a sufficient paper forming ability, the fibrid length is preferably 150 to 6000 μm, still preferably 1000 to 4000 μm. To obtain a sufficient fibrid length for paper making, the reaction step and the cutting step may be carried out separately.

During polyamide formation, hydrochloric acid is eliminated by the polycondensation reaction between a diamine and dicarboxylic acid halide. The inventors have discovered that the polyamide formation is accompanied by ion exchange of water glass as represented by scheme 1, followed by dehydration represented by scheme 2, whereby water glass undergoes condensation to produce glass with its alkali metal removal, i.e., good quality silica-type glass, in a dispersed state in the polyamide matrix.

Scheme 1:

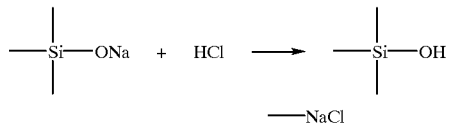

Sheme 2:

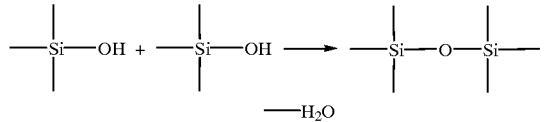

The above mechanism of reaction means that polycondensation of water glass proceeds coupled with polyamide formation to form siloxane bonds and networks thereof and, at the same time, a network structure of the siloxane bonds. Water glass, which is an alkali metal salt, is essentially water-soluble but becomes water-insoluble after formation of a network structure. It was confirmed that an ash component attributed to silica-type glass is observed in resultant composite washed thoroughly with water.

The above-described reaction of water glass is not independent but is induced by hydrochloric acid that is released via amide linkage formation. For this reason, the produced silica is taken into the polyamide matrix in an extremely finely dispersed state to furnish a uniform composite.

The network structure made up of the Si—O—Si bonds can be evaluated in terms of $Q^n$ distribution (n=0 to 4) in $^{29}$Si nuclear magnetic resonance (NMR) analysis described in detail in Examples hereinafter given. The proportion of $Q^4$ increases with the progress of conversion to silica. It is preferred that the resulting glass be of silica type, having $Q^4$ in a proportion of 60% or higher, particularly 75% or higher.

After completion of the reaction, components other than the composite can be removed from the reaction mixture. For example, the composite is collected by filtration and dried. For the purpose of completely removing the unreacted monomers or any by-products, the collected composite can be washed with an organic solvent or water, for example, acetone and then water, followed by filtration and drying.

The glass content in the resulting composite can be determined by the calcination of the composite in air at 600° C. or higher to burn up the polyamide and measuring the residual ash. The shape of the composite remained unchanged even after the calcination, which means that the glass as an inorganic filler has been distributed finely and uniformly in the polyamide matrix. Spectroscopic identification on the composite by solid state $^{29}$Si NMR reveals sufficient formation of the silica network structure as shown in scheme 2.

The ash content (% by weight) in the composite can be controlled by adjusting such conditions as a water glass concentration in the aqueous solution (A). In general, a high water glass concentration gives a high ash content. Taking the system comprising 1,6-diaminohexane and adipoyl chloride, for instance, an aqueous solution (A) having a water glass concentration of 40 g/l provides a composite having an ash content of 60% by weight or higher. As previously stated, since water glass serves as acid acceptor, a trend is observed that the polyamide yield increases with increasing water glass concentration.

As previously referred to, the alkali metal content of the glass in the composite is lower than that of the starting water glass. More specifically, it is possible to prepare a composite having an ash content of 30% by weight or more in which the glass component has an alkali metal content less than 2.2% by weight. A preferred alkali metal content in the glass component is less than 1.0% by weight, particularly less than 0.2% by weight. The alkali metal content (wt %) in the glass component is calculated by formula: alkali metal content (wt %) of composite/ash content (wt %) of composite×100. The rate of alkali metal removal can be calculated from the alkali metal and ash contents of the composite. Alkali metals can be quantified by the atomic absorption analysis. The rate of alkali metal removal reached by the invention is 93% or more, advantageously 98% or more.

The glass in the glass-polyamide composite of the present invention usually exists as spherical particles having an average particle size of 8 to 300 nm. For manifestation of sufficient heat resistance and mechanical characteristics, it is preferred that the glass has an average particle size of 8 to 160 nm. The glass particles exhibit very satisfactory adhesion to the polyamide matrix. Because reinforcing glass particles are spherical, the improvements in properties are much less anisotropic than those observed for fibrous glass. For example, a plate material is obtained with a reduced difference in linear thermal expansion coefficients between the thickness direction and the planar direction. While a glass fiber-reinforced plastic plate generally fails to enjoy sufficient improvement on dimensional stability particularly in its thickness direction, the glass-polyamide composite of the present invention can have its linear thermal expansion coefficient reduced to 3×10$^{-6}$ (1/° C.) or less at −30 to 30° C. in the thickness direction as well as the planar direction.

The ash content of the glass-polyamide composite of the present invention can also be adjusted by mixing the composite with the same type or a different type of polyamide in a molten state or dissolved state. For example, melt-kneading a glass-polyamide composite having an ash content of 50% by weight with the same type or a different kind of pure polyamide provides a uniform composite having an ash content of 25% by weight or less. The glass-polyamide composite may be melt-kneaded with other polymers to obtain a glass-polymer composite.

The mixing in a dissolved state is also an effective means for making fibrid from a composite that cannot be obtained in the form of fibrid directly from the reaction system. Aromatic polyamide composites synthesized from an aromatic diamine and an aromatic dicarboxylic acid halide, e.g., poly(m-phenyleneisophthalamide) synthesized from m-phenylenediamine and isophthaloyl chloride, have very high heat-resistance but cannot be obtained in the form of fibrid but fine powder. In such cases, the composite can be mixed with the same kind or a different kind of polyamide, e.g., poly(m-phenyleneisophthalamide) in an amide solvent, such as N-methyl-2-pyrrolidinone (hereinafter abbreviated as NMP) or N,N-dimethylacetamide, and the mixture is placed in a coagulating bath, such as water, to obtain fibrid.

The fibrid of the glass-polyamide composite of the present invention can be made into synthetic fiber paper from a water dispersion in a customary manner. For example, the dispersion liquid is passed through a filter, such as a stainless steel net or filter paper. While not essentially required, a binder can be used in paper making if desired. The dispersion liquid may also contain other components, such as minerals (e.g., mica) and short fibers (e.g., glass fibers). Filtration can be followed by drying at room temperature to 90° C. to let water evaporate.

Paper made of the composite according to the present invention is white or nearly white.

The composite of the present invention is useful as a molding material for films or three-dimensional solid articles as well as a paper making material. A solid article is obtained by, for example, compression molding at or above the melting point of the polyamide matrix under a pressure of 10 to 900 MPa. The composite is compression molded either in a dry or paste state as containing 20 to 70 parts by weight of liquid, e.g., acetone or water, per 100 parts by weight of the composite. The semi-solid state is particularly effective in molding a composite having an ash content of 40% by weight or greater. It is also obtained by dispersing the once dried composite in a medium such as acetone or water, followed by filtration. The composite of the present invention is useful as a material for paper, sheet, a film and any other molding materials having excellent heat-resistance, mechanical characteristics, hardness, and dimensional stability.

The present invention will now be illustrated in greater detail with reference to Examples for illustrative purposes only but not for limitation. Measurements and analyses employed in Examples are as follows.

1) Measurement of Ash Content

A composite was calcined in air at 800° C. for 3 hours to completely burn up the polyamide component and weighed. The ash content (wt %) was calculated from the weight change. The ash content was used for evaluation of the glass content of the composite.

2) Measurement of Sodium Content

A composite was dissolved first in nitric acid and then in hydrochloric acid. The solution was analyzed by atomic absorption spectroscopy to determine the sodium content. Regarding the ash as measured in (1) above as an $SiO_2$—$Na_2O$ composite, the Na removal rate (R; %) based on the starting water glass composition was calculated from the Na content thus obtained in accordance with the following equation:

$$R(\%) = 100 - \frac{100 \times Wm \cdot (Mm \div 8)/Mm}{(Wa - Wm \cdot (Mm + 8)/Mm) \cdot (2Mm + 16)/(n \cdot Msi)}$$

wherein

Wm: alkali metal content (wt %) in the composite

Wa: ash content (wt %)

Mm: atomic weight of the alkali metal (M) constituting water glass

Msi: formula weight of silicon dioxide (=60.1)

n: $SiO_2/M_2O$ molar ratio of starting water glass

3) Transmission Electron Microscopy (TEM)

A 75 nm thick slice was cut from a sample with a microtome and observed by a transmission electron microscope (JEM-200CX, manufactured by JEOL, Ltd.) at a magnification of 100,000.

4) $^{29}Si$ Nuclear Magnetic Resonance (NMR) Spectroscopy

NMR data were recorded in an NMR spectrometer (JEOL-GSX-400, manufactured by JEOL, Ltd.). A solid state spinning probe was used at 4.3 kHz and at a magic angle of 54.7°. All chemical shifts were given from tetramethylsilane (0 ppm).

The local chemical structures of silicon atoms (underlined) are divided into five categories; $\underline{Si}(OSi)_4$ [$Q^4$: ca. −110 ppm], $XO$—$\underline{Si}(OSi)_3$ [$Q^3$: ca. −100 ppm], $(XO)_2$—$\underline{Si}(OSi)_2$ [$Q^2$: ca. −90 ppm], $(XO)_3$—$\underline{Si}(OSi)$ [$Q^1$: −80 ppm], and $(XO)_4$—$\underline{Si}$ [$Q^0$; −80 ppm], wherein X represents an atom other than Si, as described in J. Am. Chem. Soc., Vol. 102, pp. 4889–4893 (1980). Therefore, the chemical structure of the glass component can be chemically characterized by the resonance intensity distribution of five peaks $Q^0$ to $Q^4$. For example, the starting water glass employed in the Examples had a distribution of $Q^0/Q^1/Q^2/Q^3/Q^4$=0%/6%/28%/49%/17%. Pure $SiO_2$ (quartz) shows only the $Q^4$ peak. The proportion of $Q^4$ increases with an increasing degree of the condensation reaction of water glass.

5) Hardness

Hardness under a testing load of 10 gf at 25° C. was obtained with a dynamic ultramicro hardness tester (DUH-200, manufactured by Shimadzu Corp.).

6) Linear Thermal Expansion Coefficient

A sample was heated in air at a scan rate of 2° C./min on a thermomechanical analyzer (TMA/SS120C., manufactured by Seiko Instruments Inc.). An average linear thermal expansion coefficient in a prescribed temperature range in the thickness direction and the planar direction was obtained. Calculations were made in accordance with the formula described in ASTM D696.

7) Tensile Properties

A dry sample and a wet sample (prepared by soaking in water) was each tested on Autograph AG-2000, manufactured by Shimadzu Corp. under conditions of an initial gauge distance of 10 mm, a cross head speed of 1 mm/min, and a temperature of 25° C.

8) Storage Modulus

A storage modulus of a sample was determined on DMS200, manufactured by Seiko Instruments Inc., under conditions of a gauge length of 10 mm, tensile mode at 1 Hz, at a scan rate of 5° C./min, in a nitrogen atmosphere at 25° C., 100° C. or 200° C.

9) Thermal Dimensional Change in Thickness Direction

A sheet of paper was heated in TMA/SS120C (manufactured by Seiko Instruments Inc.) in air at a scan rate of 5° C./min under a load of 200 mg. A change in thickness at 200° C. and 350° C. was recorded.

EXAMPLE 1

A mixture of 3.76 g of a water glass solution (sodium silicate solution No. 3 produced by Kishida Kagaku K.K.; $Na_2O.3.1SiO_2$; water content: 60 wt %) and 4.64 g of 1,6-diaminohexane was stirred while adding thereto distilled water at room temperature to prepare 300 ml of a clear and uniform aqueous solution. Separately, toluene was added to 7.32 g of adipoyl chloride at room temperature while stirring to prepare 200 ml of a clear and uniform organic solution.

The aqueous solution was put in a 1 l-volume blender jar (equipped with a stirrer) produced by Osterizer, and the organic solution was added thereto all at once at 25° C. while stirring at 10000 rpm, whereupon a white composite precipitated. Stirring of the suspended system was continued for 2 minutes. The resulting composite was collected on a funnel, washed successively with boiling acetone and distilled water, and dried in vacuo at 80° C. to obtain fibrid of a white and uniform glass-nylon 66 composite.

The results are shown in Table 1 below. TEM revealed that the glass component existed as spherical particles having an average particle size of about 100 nm. From the $^{29}Si$ NMR spectrum, a $Q^0/Q^1/Q^2/Q^3/Q^4$ distribution was found to be 0%/0%/0%/20%/80%. The resulting composite was compression molded in a hydraulic press at 290° C. and 20 MPa to obtain a 2 mm-thick film. The hardness of the film is shown in Table 2 below.

EXAMPLE 2

Fibrid of a white and uniform glass-nylon 66 composite was prepared in the same manner as in Example 1, except for changing the amount of the water glass solution from 3.76 g to 6.66 g. The results are shown in Table 1. The $^{29}Si$ NMR spectrum gave a $Q^0/Q^1/Q^2/Q^3/Q^4$ distribution of 0%/0%/2%/35%/63%. The resulting composite was compression molded in a hydraulic press at 290° C. and 20 MPa to obtain a 2 mm-thick plate. The linear thermal expansion coefficient and hardness of the plate are shown in Table 2.

EXAMPLE 3

Fibrid of a white and uniform glass-nylon 66 composite was prepared in the same manner as in Example 1, except for changing the amount of the water glass solution from 3.76 g to 13.32 g. The results are shown in Table 1. TEM observation revealed that the glass component existed as spherical particles having an average particle size of about 200 nm. As a result of $^{29}Si$-NMR analysis, the $Q^0/Q^1/Q^2/Q^3/Q^4$ distribution was found to be 0%/0%/0%/22%/78%.

EXAMPLE 4

Fibrid of a white and uniform glass-nylon 66 composite was prepared in the same manner as in Example 1, except for changing the amount of the water glass solution from 3.76 g to 30 g. The results are shown in Table 1. The resulting composite was dispersed in acetone, followed by filtration to obtain a semi-solid composite having an acetone content of 45 wt %. TEM revealed presence of the glass component in the form of spherical particles having an average particle size of about 10 nm. The semi-solid composite was compression molded in a hydraulic press at 320° C. and 800 MPa to obtain a 2 mm-thick plate. The linear thermal expansion coefficient and hardness of the plate are shown in Table 2.

EXAMPLE 5

Fibrid of a white and uniform glass-nylon 66 composite was prepared in the same manner as in Example 1, except for changing the amount of the water glass solution from 3.76 g to 60 g. The results are shown in Table 1. A $Q^0/Q^1/Q^2/Q^3/Q^4$ distribution of 0%/0%/0%/18%/82% was obtained from the $^{29}Si$-NMR analysis.

EXAMPLE 6

A mixture of 3.76 g of the same water glass solution as used in Example 1 and 4.64 g of 1,6-diaminohexane was stirred while adding thereto distilled water at room temperature to prepare 40 ml of a clear and uniform aqueous solution. Separately, toluene was added to 7.32 g of adipoyl chloride at room temperature while stirring to prepare 26.7 ml of a clear and uniform organic solution.

The aqueous solution was put in a 1 l-volume Osterizer blender jar equipped with a stirrer, and the organic solution was added thereto all at once at 25° C. while stirring at 10000 rpm, whereupon a white composite precipitated. Stirring of the suspended system was continued for 2 minutes. The resulting composite was collected on a funnel, washed successively with boiling acetone and distilled water, and dried in vacuo at 80° C. to obtain fibrid of a white and uniform glass-nylon 66 composite. The results are shown in Table 1.

EXAMPLE 7

A mixture of 17 g of the same water glass solution as used in Example 1 and 2.9 g of 1,6-diaminohexane was stirred at room temperature while adding thereto distilled water to prepare 36 ml of a clear and uniform aqueous solution. Separately, toluene was added to 4.57 g of adipoyl chloride at room temperature while stirring to prepare 100 ml of a clear and uniform organic solution.

Fibrid of a white and uniform glass-nylon 66 composite was prepared using the aqueous solution and the organic solution in the same manner as in Example 6. The results are shown in Table 1.

EXAMPLE 8

A mixture of 15 g of the same water glass solution as used in Example 1 and 2.32 g of 1,6-diaminohexane was stirred at room temperature while adding thereto distilled water to prepare 60 ml of a clear and uniform aqueous solution. Separately, tetrahydrofuran was added to 3.66 g of adipoyl chloride at room temperature while stirring to prepare 60 ml of a clear and uniform organic solution.

Fibrid of a white and uniform glass-nylon 66 composite was prepared using the aqueous solution and the organic solution in the same manner as in Example 6. The results are shown in Table 1.

COMPARATIVE EXAMPLE 1

Pellets of pure nylon 66 (Ube 2020B) was injection molded using an injection molding machine (SIM4749, manufactured by Technoplas) under conditions of 270° C. in cylinder temperature, 80° C. in mold temperature, and 43 MPa in injection pressure to obtain a 2 mm-thick plate. The linear thermal expansion coefficient and the hardness of the plate are shown in Table 2.

COMPARATIVE EXAMPLE 2

Chopped strand glass (03-JA404, produced by Asahi Fiber Glass; diameter: 10 μm) and pure nylon 66 (Ube 2020B) were melt-kneaded at a prescribed mixing ratio in a twin-screw extruder (MP2015, manufactured by Tsubaco) at 270° C. and pelletized to obtain a composite composed of glass fiber and nylon 66. The ash content of the composite was 31.3 wt %. The resulting pellets were injection molded under the same conditions as in Comparative Example 1 to prepare a 2 mm-thick plate. The linear thermal expansion coefficient and the hardness of the plate are shown in Table 2.

TABLE 1

|  | Ash Content (wt %) | Na Content of Composite (wt %) | Na Content of Glass (wt %) | Na Removal Rate (%) |
| --- | --- | --- | --- | --- |
| Example 1 | 9.8 | 0.0072 | 0.73 | 99.7 |
| Example 2 | 31.1 | 0.0028 | 0.009 | 99.96 |
| Example 3 | 50.1 | 0.0013 | 0.003 | 99.99 |
| Example 4 | 60.5 | 0.60 | 0.992 | 95.9 |
| Example 5 | 66.9 | 1.12 | 1.67 | 93.1 |
| Example 6 | 30.4 | 0.01 | 0.033 | 99.9 |
| Example 7 | 45.9 | 0.07 | 0.148 | 99.9 |
| Example 8 | 61.3 | 0.04 | 0.065 | 99.7 |

TABLE 2

|  | Linear Thermal Expansion Coefficient (−30 to 30° C.) | | Hardness $(gf/\mu m^2)$ |
| --- | --- | --- | --- |
|  | Thickness Direction | Planar Direction |  |
| Example 1 | — | — | 27.9 |
| Example 2 | $0.2 \times 10^{-5}$ | $0.1 \times 10^{-5}$ | 41.7 |
| Example 4 | $0.2 \times 10^{-5}$ | $0.2 \times 10^{-5}$ | 83.7 |
| Comparative Example 1 | $13 \times 10^{-5}$ | $12 \times 10^{-5}$ | 13.7 |
| Comparative Example 2 | $7.5 \times 10^{-5}$ | $2.5 \times 10^{-5}$ | 25.1 |

EXAMPLE 9

A mixture of 30 g of the same water glass solution as used in Example 1 and 4.64 g of 1,6-diaminohexane was stirred at room temperature while adding thereto distilled water to prepare 300 ml of a clear and uniform aqueous solution. Separately, toluene was added to 7.32 g of adipoyl chloride at room temperature while stirring to prepare 200 ml of a clear and uniform organic solution.

The aqueous solution was put in a 1 l-volume beaker, and the organic solution was added thereto all at once while stirring the aqueous solution with a stirrer (Ultra-Turrax 50N-W80SMK, manufactured by IKA) at 3000 rpm and 25° C., whereupon a white and pasty composite precipitated. Stirring of the system was continued for 2 minutes. The resulting composite was washed successively with acetone and distilled water and put in a 1 l Osterizer blender jar equipped with a metal cutting blade together with water. The blade was rotated at 10000 rpm for 20 seconds to cut the composite into fibrid of a uniform glass-nylon 66 composite.

The resulting fibrid dispersion was passed through a paper-making filter to form a paper layer and dried at 80° C. to obtain 0.5 mm thick white paper. The results are shown in Table 3 below. TEM revealed presence of the glass component in the form of spherical particles having an average particle size of about 10 nm. The physical properties of the resulting paper are shown in Table 4 below.

EXAMPLE 10

Fibrid of a uniform glass-nylon 66 composite was prepared in the same manner as in Example 9, except for changing the amount of the water glass solution from 30 g to 13.3 g. Of the fibrid was made 0.5 mm thick white paper in the same manner as in Example 9. The results are shown in Table 3. TEM revealed presence of the glass component in the form of spherical particles having an average particle size of about 150 nm. The physical properties of the resulting paper are shown in Table 4.

EXAMPLE 11

The same aqueous solution as used in Example 1 was put into a 1 l beaker, and the same organic solution as used in Example 1 was carefully poured thereon to form immiscible two phases, the organic solution as an upper layer and the aqueous solution as a lower layer. A thin film formed on the interface of the two phases at 25° C. was continuously taken out in the form of thread. The resulting composite in a thread form was put in a 1 l Osterizer blender jar equipped with a metal cutting blade together with water and cut into fibrid at 10000 rpm, washed successively with acetone and distilled water, and dispersed in water to obtain a dispersion of fibrid of glass-nylon 66 composite.

The resulting dispersion was passed through a paper-making filter to form a layer and dried at 80° C. to obtain 0.5 mm thick white paper. The results are shown in Table 3. TEM revealed presence of the glass component in the form of spherical particles having an average particle size of about 10 nm. The physical properties of the resulting paper are shown in Table 4.

EXAMPLE 12

Fibrid of a glass-nylon 610 composite was prepared in the same manner as in Example 9, except for replacing 7.32 g of adipoyl chloride with 9.56 g of sebacoyl chloride. White paper having a thickness of 0.5 mm was prepared from the resulting fibrid in the same manner as in Example 9. The results are shown in Table 3.

COMPARATIVE EXAMPLE 3

White nylon 66 paper having a thickness of 0.5 mm was prepared in the same manner as in Example 9, except that the aqueous solution contained no water glass. The results are shown in Tables 3 and 4.

COMPARATIVE EXAMPLE 4

White nylon 610 paper having a thickness of 0.5 mm was prepared in the same manner as in Example 12, except that the aqueous solution contained no water glass. The results are shown in Table 3.

TABLE 3

|  | Fibrid Length ($\mu$m) | Ash Content (wt %) | Na Content of Composite (wt %) | Na Content of Glass (wt %) | Na Removal Rate (%) | Tensile Strength (MPa) Dry | Tensile Strength (MPa) Wet |
|---|---|---|---|---|---|---|---|
| Example 9 | 210 | 59.0 | 0.58 | 0.98 | 95.8 | 1.8 | 0.9 |
| Example 10 | 290 | 49.1 | 0.002 | 0.004 | 99.98 | 1.9 | 1.1 |
| Example 11 | 3100 | 57.1 | 0.53 | 0.93 | 96.2 | 5.6 | 2.4 |
| Example 12 | 240 | 47.0 | 0.99 | 2.10 | 95.9 | 1.8 | 0.8 |
| Compara. Example 3 | 240 | 0 | — | — | — | 1.4 | 0.1 |
| Compara. Example 4 | 270 | 0 | — | — | — | 1.3 | 0.1 |

TABLE 4

|  | Storage Modulus (MPa) 25° C. | Storage Modulus (MPa) 100° C. | Storage Modulus (MPa) 200° C. | Dimensional Stability (Thickness) (%) 200° C. | Dimensional Stability (Thickness) (%) 300° C. |
|---|---|---|---|---|---|
| Example 9 | 323 | 312 | 280 | 0 | −3 |
| Example 10 | 314 | 309 | 272 | 0 | −4 |
| Example 11 | 281 | 261 | 196 | 0 | −11 |
| Compara. Example 3 | 210 | 100 | 60 | −11 | −54 |

EXAMPLE 13

A mixture of 7.50 g of the same water glass solution as used in Example 1 and 2.16 g of m-phenylenediamine was stirred at room temperature while adding thereto distilled water to prepare 60 ml of a clear and uniform aqueous solution having a water glass concentration of 50 g/l. Separately, tetrahydrofuran was added to 4.06 g of isophthaloyl chloride at room temperature while stirring to prepare 60 ml of a clear and uniform organic solution.

The aqueous solution was put into a 1 l-volume Osterizer blender jar equipped with a stirrer, and the organic solution was added thereto all at once at 25° C. while stirring at 10000 rpm, whereupon a white composite precipitated. Stirring of the suspended system was continued for 2 minutes. The resulting composite was collected on a funnel, washed successively with boiling acetone and distilled water, and dried under reduced pressure at 80° C. to obtain white powder of a uniform glass-poly(m-phenyleneisophthalamide) composite. The results are shown in Table 5 below.

The resulting composite was compression molded in a hydraulic press at 350° C. and 100 MPa for 1 minute to obtain a 1 mm-thick plate. The physical properties of the plate are shown in Table 6 below.

EXAMPLE 14

White powder of a uniform glass-poly(m-phenyleneisophthalamide) composite was prepared in the same manner as in Example 13, except for changing the amount of the water glass solution from 7.50 g to 15.0 g. The results are shown in Table 5. A $Q^0/Q^1/Q^2/Q^3/Q^4$ distribution of 0%/0%/0%/7%/93% was obtained from $^{29}$Si NMR spectroscopy.

The powder was molded in a rectangular metal mold (width: 3 mm; length: 7 mm) preliminary at 25° C. and 100 MPa for 5 minutes and then at 320° C. and 10 MPa for 5 minutes to obtain a 0.5 mm thick plate. The physical properties of the plate are shown in Table 6.

COMPARATIVE EXAMPLE 5

Powder of poly(m-phenyleneisophthalamide) produced by Teijin Ltd. was compression molded in the same manner as in Example 13 to obtain a 1 mm-thick plate. The physical properties of the plate are shown in Table 6.

TABLE 5

|  | Ash Content (wt %) | Na Content of Composite (wt %) | Na Content of Glass (wt %) | Na Removal Rate (%) |
|---|---|---|---|---|
| Example 13 | 18.2 | 0.28 | 1.54 | 93.6 |
| Example 14 | 56.0 | 0.48 | 0.86 | 96.5 |

TABLE 6

|  | Linear Thermal Expansion Coefficient (Thickness Direction) (1/° C.) −30 to 30° C. | Linear Thermal Expansion Coefficient (Thickness Direction) (1/° C.) 40 to 250° C. | Hardness (gf/$\mu$m$^2$) |
|---|---|---|---|
| Example 13 | 2.7 × 10$^{-5}$ | 2.8 × 10$^{-5}$ | 50 |
| Example 14 | 0.1 × 10$^{-5}$ | 0.1 × 10$^{-5}$ | 69 |
| Comparative Example 5 | 4.1 × 10$^{-5}$ | 4.3 × 10$^{-5}$ | 42 |

EXAMPLE 15

A mixture of 300 g of the same water glass solution as used in Example 1 and 43.2 g of m-phenylenediamine was stirred at room temperature while adding thereto distilled water to prepare 1200 ml of a clear and uniform aqueous solution. Separately, tetrahydrofuran was added to 81.2 g of isophthaloyl chloride at room temperature while stirring to prepare 1200 ml of a clear and uniform organic solution.

The aqueous solution was put into a 2 l-volume Osterizer blender jar equipped with a stirrer, and the organic solution was added thereto all at once at 25° C. while stirring at 20000 rpm, whereupon a white composite precipitated. Stirring of the suspended system was continued for 2 minutes. The resulting composite was collected on a funnel, washed successively with boiling acetone and distilled water, and dried in vacuo at 80° C. to obtain white powder of a uniform composite of glass and poly(m-phenyleneisophthalamide). The ash content of the composite was 48.0 wt %, and Na content of glass was 0.35 wt % (Na removal rate=97.0%).

To 3200 ml of NMP were added 125 g of the composite powder and 175 g of powdery poly(m-phenyleneisophthalamide) while stirring at room temperature in a nitrogen atmosphere. The temperature was elevated up to 60° C. over 30 minutes while stirring, and stirring was continued at that temperature for 120 minutes. The resulting mixture, whose total concentration of poly(m-phenyleneisophthalamide) was 7 wt %, was poured into a large quantity of water (room temperature) while stirring to obtain white composite fibrid. The fibrid was collected on a funnel, washed with water, and re-dispersed in water. The resulting dispersion liquid was filtered through a paper-making filter and dried at 80° C., and compressed at 25° C. and 10 MPa to obtain 0.2 mm thick white paper made of the glass-poly (m-phenyleneisophthalamide) composite. The paper had an ash content of 20 wt %. The physical properties of the paper are shown in Table 7 below.

COMPARATIVE EXAMPLE 6

To 3200 ml of NMP was added 240 g of the same powdery poly(m-phenyleneisophthalamide) as used in Comparative Example 5 while stirring at room temperature in a nitrogen atmosphere. The temperature was elevated up to 60° C. over 30 minutes while stirring, and stirring was continued at that temperature for 120 minutes to prepare a 7 wt % poly(m-phenyleneisophthalamide) dispersion. The resulting dispersion was processed in the same manner as in Example 15 to obtain 0.2 mm thick paper made of poly(m-phenyleneisophthalamide). The physical properties of the paper are shown in Table 7.

TABLE 7

| | Tensile Strength (MPa) | | Dimensional Change in Thickness at |
|---|---|---|---|
| | Dry | Wet | 300° C. (%) |
| Example 15 | 4.3 | 3.4 | −1 |
| Comparative Example 6 | 2.2 | 1.5 | −26 |

EXAMPLE 16

A mixture of 24 g of the same water glass solution as used in Example 1 and 2.83 g of 1,6-diaminohexane was stirred at room temperature while adding thereto distilled water to prepare 66 ml of a clear and uniform aqueous solution. Separately, toluene was added to 6.7 g of isophthaloyl chloride at room temperature while stirring to prepare 66 ml of a clear and uniform organic solution.

The aqueous solution was put in a 1 l-volume Osterizer blender jar equipped with a stirrer, and the organic solution was added thereto all at once at 25° C. while stirring at 10000 rpm, whereupon a white composite precipitated. Stirring of the suspended system was continued for 2 minutes.

The resulting composite was collected on a funnel, washed successively with boiling acetone and distilled water, and dried in vacuo at 80° C. to obtain fibrid of a white and uniform glass-poly(hexamethyleneisophthalamide) composite. The results are shown in Table 8 below.

EXAMPLE 17

A mixture of 24 g of the same water glass solution as used in Example 1 and 2.83 g of 1,6-diaminohexane was stirred at room temperature while adding thereto distilled water to prepare 66 ml of a clear and uniform aqueous solution. Separately, cyclohexanone was added to 6.7 g of terephthaloyl chloride at room temperature while stirring to prepare 66 ml of a clear and uniform organic solution. The aqueous solution was put in a 1 l-volume Osterizer blender jar equipped with a stirrer, and the organic solution was added thereto all at once at 25° C. while stirring at 10000 rpm, whereupon a white composite precipitated. Stirring of the suspended system was continued for 2 minutes.

The resulting composite was collected on a funnel, washed successively with boiling acetone and distilled water, and dried in vacuo at 80° C. to obtain fibrid of a white and uniform glass-poly(hexamethyleneterephthalamide) composite. The results are shown in Table 8. The resulting composite was compression molded in a hydraulic press at 300° C. and 20 MPa to obtain a 4 mm-thick plate. Separately, the composite was dispersed in water and made into 2 mm-thick paper. The paper was treated at 200° C. for 1 hour or at 25° C. and 96% RH for 24 hours, and the dimensional change in the planar direction was determined. The results obtained are shown in Table 9 below.

EXAMPLE 18

Fibrid of a white and uniform glass-poly(hexamethyleneiso/terephthalamide) composite was prepared in the same manner as in Example 16, except: for replacing 6.7 g of terephthaloyl chloride with 6.7 g of an equal weight mixture of terephthaloyl chloride and isophthaloyl chloride. The results are shown in Table 8.

EXAMPLE 19

Fibrid of a white and uniform glass-poly(tetramethyleneterephthalamide) composite was prepared in the same manner as in Example 17, except for replacing 2.83 g of 1,6-diaminohexane with 2.91 g of 1,4-diaminobutane. The results are shown in Table 8.

COMPARATIVE EXAMPLE 7

Poly(hexamethyleneterephthalamide) was prepared in the same manner as in Example 17, except for replacing water glass with a stoichiometrically equivalent amount of sodium hydroxide. The polyamide was evaluated in the same manner as in Example 17. The results obtained are shown in Table 9.

TABLE 8

| | Ash Content (wt %) | Na Content of Composite (wt %) | Na Content of Glass (wt %) | Na Removal Rate (%) |
|---|---|---|---|---|
| Example 16 | 41.4 | 0.0006 | 0.001 | 99.99 |
| Example 17 | 44.0 | 0.0008 | 0.002 | 99.99 |
| Example 18 | 48.9 | 0.0007 | 0.001 | 99.99 |
| Example 19 | 46.0 | 0.0009 | 0.002 | 99.99 |

TABLE 9

|  | Linear Thermal Expansion Coefficient of Solid at −30 to 30° C. (1/° C.) | Dimension Change of Paper (Planar Direction) | |
|---|---|---|---|
|  |  | 200° C. | 96% RH |
| Example 17 | $2.0 \times 10^{-5}$ | 0.2 | 0.0 |
| Comparative Example 7 | $8.5 \times 10^{-5}$ | 1.2 | 0.6 |

While the invention has been described in detail and with reference to specific examples thereof, it will be apparent to one skilled in the art that various changes and modifications can be made therein without departing from the spirit and scope thereof.

What is claimed is:

1. A process for producing a glass-polyamide composite comprising bringing into contact or mixing (A) an aqueous solution containing water, water glass, and a diamine and (B) an organic solution containing an organic solvent and a dicarboxylic acid halide to carry out polyamide formation and polycondensation of water glass simultaneously.

2. A process according to claim 1, wherein the glass of said composite has an average particle size of 8 to 160 nm.

3. A process according to claim 1, wherein said water glass is represented by formula $M_2O \cdot nSiO_2$ wherein M is an alkali metal, and n is 1.2 to 4.

4. A process according to claim 1, wherein said aqueous solution (A) has a water glass concentration of 4 to 240 g/l and a diamine concentration of 0.01 to 5 mol/l, and said organic solution (B) has a dicarboxylic acid halide concentration of 0.01 to 5 mol/l.

5. A process according to claim 1, wherein said diamine is at least one member selected from the group consisting of 1,4-diaminobutane, 1,6-diaminohexane, p-phenylenediamine, m-phenylenediamine, and m-xylylenediamine, and said dicarboxylic acid halide is at least one member selected from the group consisting of adipoyl chloride, sebacoyl chloride, terephthaloyl chloride, and isophthaloyl chloride.

6. A process according to claim 1, wherein the glass in the composite has an alkali metal content of less than 2.2% by weight.

7. A glass-polyamide composite having uniformly dispersed therein 5 to 68% by weight of glass having an average particle size of 8 to 160 nm, the composite being obtained by the process described in any one of claims 1 to 6.

8. A glass-polyamide composite according to claim 7, which has a linear thermal expansion coefficient of $3 \times 10^{-6}$ (1/° C.) or less at −30° C. to 30° C.

9. A process for producing fibrid comprising mechanically cutting the glass-polyamide composite described in claim 7.

10. A process for producing fibrid comprising mixing the glass-polyamide composite described in claim 7 with the same or different polyamide from that of said glass-polyamide composite in an organic solvent, placing the mixture in a coagulating bath, and mechanically cutting the resulting solid.

11. Fibrid of a glass-polyamide composite which has uniformly dispersed therein glass having an average particle size of 8 to 160 nm, obtained by the process described in claim 9.

12. A process for producing paper or sheet comprising using the fibrid obtained by the process described in claim 9.

13. Paper or sheet made of fibrid of a glass-polyamide composite having uniformly dispersed therein glass having an average particle size of 8 to 160 nm, obtained by the process described in claim 12.

* * * * *